United States Patent [19]

Burkholder

[11] Patent Number: 4,538,947
[45] Date of Patent: Sep. 3, 1985

[54] SET SCREW

[76] Inventor: Jack Burkholder, Rt. 2, Box 170AA, Eastland, Tex. 76448

[21] Appl. No.: 554,992

[22] Filed: Nov. 25, 1983

[51] Int. Cl.³ .............................................. F16B 35/00
[52] U.S. Cl. .................................... 411/393; 411/387; 411/31; 408/211
[58] Field of Search ................. 411/31, 386, 387, 393; 408/211, 227, 228, 231

[56] References Cited

U.S. PATENT DOCUMENTS

| 796,321 | 8/1905 | Granberg | 408/211 |
| 1,755,489 | 4/1930 | Phillips | 411/31 |
| 2,652,083 | 9/1953 | Emmons | 408/211 |
| 2,654,284 | 10/1953 | Schevenell | 411/387 |

FOREIGN PATENT DOCUMENTS 648504  1/1951  United Kingdom ................ 411/393

Primary Examiner—Thomas J. Holko
Assistant Examiner—Neill Wilson
Attorney, Agent, or Firm—Head, Johnson & Stevenson

[57] ABSTRACT

A set screw having a cutting element provided on the outer end thereof for a "biting" engagement with the outer periphery of a pipe, or the like, the cutting element comprising a cutting edge adapted for a penetration of the pipe in a manner requiring minimum torque on the screw during the installation thereof.

2 Claims, 4 Drawing Figures

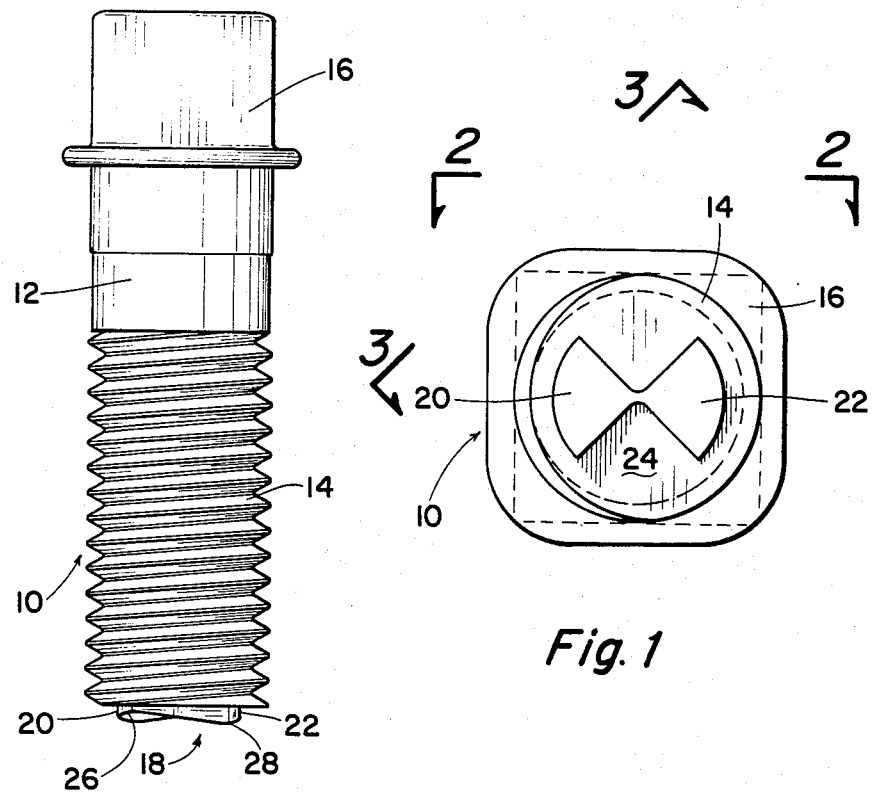
Fig. 1
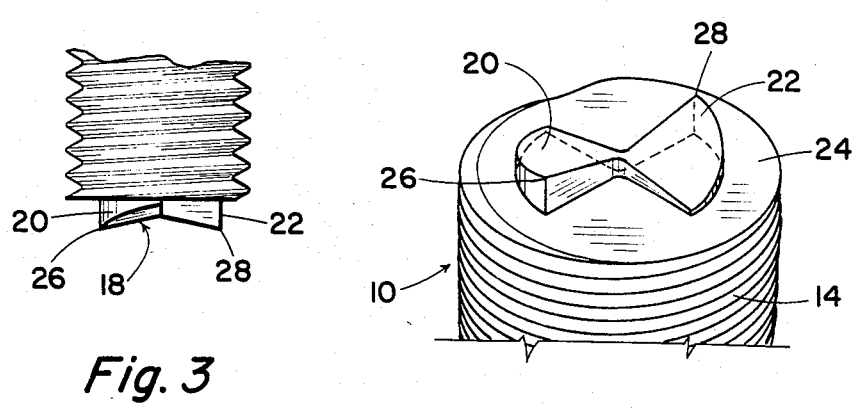
Fig. 2
Fig. 3
Fig. 4

SET SCREW

BACKGROUND OF THE INVENTION

1. Field of the Invention

This invention relates to improvements in set screws and more particularly, but not by way of limitation, to a set screw adapted to require minimum torque in use.

2. Description of the Prior Art

Pipe sections are frequently secured in end-to-end or in tandem relation by means of coupling members of a push-on pipe bell or fitting bell elements which do not require the use of threaded connection between the fitting of the end of the pipe section or pipe joint. It is common practice to utilize set screws cooperating between the bell fitting and the pipe end inserted thereto to restrain the pipe against movement due to the internal pressure within the pipe. Many of the pipe sections and fittings used in such installations is ductile iron pipe having the inner periphery thereof coated with cement. The set screw normally extends radially through the side wall of the bell fitting and into engagement with the outer periphery of the pipe. When a set screw is torqued to a high value in order to penetrate the outer periphery of the pipe for providing a secure connection therewith, the cement coating is frequently cracked, and the cement may loosen from the wall of the pipe or fitting and fall out. Of course, when the cement is thus lost from the inner wall of the pipe or fitting, the iron material from which the pipe or fitting is constructed is exposed to the water, or other fluid, moving through the pipe. This has long been a problem in the industry.

SUMMARY OF THE INVENTION

The present invention contemplates a novel set screw which has been particularly designed and constructed for overcoming the foregoing disadvantages. The novel set screw is provided with an engaging element on the outer end thereof adapted to penetrate the wall of the ductile iron pipe to hold the pipe against moving due to the internal pressure in the line. The depth of penetration of the set screw is relatively small, as for example, 0.050 inch, which is not harmful to the pipe. Since the outer end of the set screw penetrates the wall of the pipe, the torque on the set screw may be far less than the torque normally used with presently available set screws. This low torque requirement is an advantage since the wall of the pipe will not bend during the setting of the screw. Thus, the sealing at the gasket between the pipe and the fitting will be efficient. The holding power of the set screw is determined by the tensile strength of the ductile iron material of the pipe wall. The low torque value is also of an advantage in that the set screw will not crack the cement lining in the pipe. One particular configuration for the outer end of the set screw comprises a pair of oppositely disposed segments, each having a compound taper provided on the outer surface thereof, the taper terminating in a cutting point at the radially outer portion thereof and a recessed area at the juncture between the two segments. This permits a ready penetration of the wall of the pipe with a minimum torque requirement as the set screw is installed. It will be apparent, however, that other penetratable configurations for the outer end of the set screw may be provided. The novel set screw is simple and efficient in operation and economical and durable in construction.

BRIEF DESCRIPTION OF THE DRAWINGS

FIG. 1 is a bottom view of a set screw embodying the invention.

FIG. 2 is a view taken on line 2—2 of FIG. 1.

FIG. 3 is a view taken on line 3—3 of FIG. 1.

FIG. 4 is an isometric view of the bottom of a set screw embodying the invention, with the bottom in an "up" orientation.

DETAILED DESCRIPTION OF THE PREFERRED EMBODIMENT

Referring to the drawings in detail, reference character 10 generally indicates a set screw comprising a shank 12 having a threaded portion 14 at one end thereof and a head member 16 at the opposite end thereof. The head member 16 may be of any normal or standard type, and as shown herein preferably of a substantially square cross sectional configuration for facilitating rotation of the screw 10 by engagement of the flat sides of the head 16 by a suitable tool (not shown) or manually, as desired and as is well known. The threaded portion 14 may also be of substantially any normal or standard thread construction, as desired. However, it is to be noted that the particular design of the screw 10 is such that a national course thread may be utilized for the threaded portion 14, if desired.

The outer end of the threaded portion 14 is provided with a cutting element generally indicated at 18 which is constructed for penetrating the outer periphery of a pipe section (not shown) or the like with which the screw 10 is to be utilized. The particular cutting element 18 shown herein comprises a pair of substantially pie-shaped segments 20 and 22 extending axially outwardly from a substantially flat or planar surface 24. The inner end of each segment 20 and 22 is disposed at the center or longitudinal axis of the shank 12 and are preferably conterminous with each other, as particularly shown in FIG. 4. The outer surface of each segment 20 and 22 is of a compound taper, increasing in both a radially outward direction from the conterminous inner ends thereof and a circumferential direction about the axis of the shank 12. In this manner, the segments 20 and 22 are provided with a cutting edge or point 26 and 28, respectively. In addition, the conterminous inner ends of the segments 20 and 22, or the central portion of the cutting element 18 is recessed with respect to the position of the cutting edges 26 and 28.

In use, the set screw 10 may be inserted into the usual threaded bore (not shown) normally provided in the sidewall of a bell fitting (not shown) such as the type hereinbefore set forth. The screw 10 may be rotated about its own longitudinal axis in the usual manner, such as by engaging the flat sides of the head member 16 with a suitable tool for rotation of the screw. When the screw has been moved through the threaded bore a sufficient distance as to bring the cutting element 18 into the proximity of or into engagement with the outer periphery of the pipe (not shown) disposed within the bell fitting, the cutting edges 26 and 28 will initially engage the pipe. Continued rotation of the screw 10 will cause the cutting edges 26 and 28 to readily penetrate the outer periphery of the pipe. The compound taper of the outer surface of the segments 20 and 22 facilitates penetration of the cutting edge 26 and 28 into the pipe. The fact that the taper "falls away" in both a circumferential and a radial direction reduces the amount of surface engaged with the pipe during the penetration or "biting" action of the segments 20 and 22, thus reducing the friction between the segments and the pipe. The "biting" engagement of the outer periphery of the pipe may thus be achieved with considerably less torque applied to the screw 10. Thus, the stress applied to the cement lining of the pipe or fitting is considerably reduced, and the danger of damage to the cement is substantially eliminated.

Whereas the particular cutting element 18 as shown and described herein incorporates the two substantially identical but oppositely disposed segments 20 and 22, it is to be understood that the cutting element 18 may assume many different configurations. The importance of the cutting element 18 is the fact that it is provided with cutting or penetrating means which readily bites into or penetrates the outer periphery of the pipe with a minimum of torque application to the set screw itself.

From the foregoing it will be apparent that the present invention provides a novel set screw particularly designed for pipe sections against longitudinal movement due to the internal fluid pressure present within the pipe. The novel set screw is provided with a cutting element on the outer end thereof adapted to easily penetrate the outer periphery of the pipe during the installation of the set screw, thus reducing the required torque for the setting of the screw and substantially eliminating damage to the cement lining of the pipe or fitting with which the set screw is utilized.

Whereas the present invention has been described in particular relation to the drawings attached hereto, it should be understood that other and further modifications, apart from those shown or suggested herein may be made within the spirit and scope of this invention.

What is claimed is:

1. A set screw comprising shank means, cutting element means provided at one end of the shank means for a penetrating engagement with an object upon installation of the set screw, wherein the cutting element means extends axially outwardly from said one end of the shank means, and wherein the cutting element means comprises a pair of substantially identical oppositely disposed cutting segments of a substantially pie shaped configuration, a cutting edge provided for each cutting segment for an initial engagement with the object, the inner end of each segment being disposed at the axial center of the shank means and the outer periphery of each segment terminating radially inwardly of the outer periphery of the set screw, the outer surface of each segment being of a compound taper configuration having both circumferential and radial tapers across the outer face of each segment whereby the cutting edges engage the object prior to engagement thereof by the compound tapered surfaces.

2. A set screw as set forth in claim 1 wherein the inner end of each segment is of a lesser depth than the outer periphery thereof.

* * * * *